United States Patent [19]
Kitano et al.

[11] Patent Number: 5,912,089
[45] Date of Patent: Jun. 15, 1999

[54] ALKALINE STORAGE BATTERY

[75] Inventors: Shinichiro Kitano; Hideki Matsui; Kenji Arisawa, all of Sumoto; Kazuaki Ozaki, Hyogo-ken; Masayuki Terasaka, Hyogo-ken; Kazuki Shimozono, Hyogo-ken; Kensuke Nakatani, Hyogo-ken, all of Japan

[73] Assignee: Sanyo Electric Co., Ltd., Osaka, Japan

[21] Appl. No.: 08/891,615

[22] Filed: Jul. 10, 1997

[30] Foreign Application Priority Data

Jul. 10, 1996 [JP] Japan .................................. 8-180992
Feb. 25, 1997 [JP] Japan .................................. 9-041177

[51] Int. Cl.⁶ ................................................. H01M 2/22
[52] U.S. Cl. ......................... 429/53; 429/122; 429/164; 429/174; 429/178
[58] Field of Search ................................. 429/53, 54, 94, 429/163, 164, 61, 60, 178, 170, 174, 122

[56] References Cited

U.S. PATENT DOCUMENTS

| | | | |
|---|---|---|---|
| 3,485,673 | 12/1969 | Jost | 429/54 |
| 3,546,024 | 12/1970 | Niklas | 429/61 |
| 4,216,277 | 8/1980 | Uba . | |
| 4,298,662 | 11/1981 | Sugalski et al. | 429/54 X |
| 4,654,963 | 4/1987 | Sugalski | 429/171 X |
| 5,238,757 | 8/1993 | Suzuki et al. | 429/94 |
| 5,418,082 | 5/1995 | Taki et al. | 429/53 |
| 5,521,021 | 5/1996 | Alexandres et al. | 429/54 |

FOREIGN PATENT DOCUMENTS

| | | |
|---|---|---|
| 0 545 906 | 6/1993 | European Pat. Off. . |
| 08 329 911 | 12/1996 | Japan . |
| WO 97/40544 | 10/1997 | WIPO . |

Primary Examiner—Anthony Skapars
Attorney, Agent, or Firm—Nixon & Vanderhye P.C.

[57] ABSTRACT

An alkaline storage battery including a bottomed cell casing assembled as either one of positive and negative terminals, a closure cap assembly coupled with an opening of the cell casing in a liquid-tight manner as the other terminal to hermetically seal the interior of the cell casing and a generator element composed of positive and negative electrodes assembled within the cell casing, wherein a current collecting plate extended from either one of the positive and negative electrodes is welded at least at two spaced portions thereof with a bottom surface of the closure cap assembly to enhance mechanical strength and the vibration resistance property of the storage battery and to reduce internal resistance of the storage battery.

22 Claims, 5 Drawing Sheets

ALKALINE STORAGE BATTERY

BACKGROUND OF THE INVENTION

1. Field of the Invention

The present invention relates to an alkaline storage battery which includes a bottomed cell casing assembled as either one of negative and positive terminals, a closure cap assembly coupled in a liquid-tight manner with an opening of the cell casing as the other terminal to hermetically seal the interior of the cell casing and a generator element composed of positive and negative electrodes assembled within the cell casing. More particularly, the present invention is concerned with a current collecting structure of the generator element and a method of welding a positive current collecting plate extended from either one of the positive and negative electrodes to a bottom surface of the closure cap assembly.

2. Description of the Prior Art

In a conventional alkaline storage battery such as a nickel-cadmium storage battery, a nickel-hydride storage battery or the like, positive and negative electrode sheets are spirally wound through a separator sheet into a cylindrical body to provide a generator element. The generator element is contained in a metallic cell casing, and a positive current collecting plate extended from the positive electrode sheet is welded to a bottom surface of a closure cap assembly. Thereafter, the closure cap assembly is coupled with an opening of the cell casing through an insulation gasket to hermetically seal the interior of the storage battery.

In use of the alkaline storage battery as an electric power source in an electrically operated tool, an electric bicycle or an electric motor cycle, there is a concern that the current collector plate will become removed from the closure cap assembly due to vibration applied thereto. To avoid such removal of the current collecting plate, it is required to enhance the vibration resistance property of the storage battery. In such use of the alkaline storage battery, it is also required to reduce internal resistance of the storage battery for discharge of a large amount of electric current.

In the conventional alkaline storage battery, however, the current collecting plate is welded only at one portion to the bottom surface of the closure cap assembly. For this reason, the vibration resistance property of the storage battery is insufficient, and the internal resistance of the storage battery may not be reduced.

SUMMARY OF THE INVENTION

It is, therefore, a primary object of the present invention to provide an alkaline storage battery superior in vibration resistance property and capable of reducing internal resistance thereof for discharge of a large amount of electric current.

According to the present invention, the primary object is accomplished by providing an alkaline storage battery including a bottomed cell casing assembled as either one of positive and negative terminals, a closure cap assembly coupled in a liquid-tight manner with an opening of the cell casing as the other terminal to hermetically seal the interior of the cell casing and a generator element composed of positive and negative electrodes assembled within the cell casing, wherein a current collecting plate extended from either one of the positive and negative electrodes is welded at least at two spaced portions thereof with a bottom surface of the closure cap assembly.

In the alkaline storage battery, the closure cap assembly is provided with a safety vent for release of gas produced in the storage battery, and the current collecting plate is formed with an aperture positioned between the two spaced portions welded to the bottom surface of the closure cap assembly and opposed to the safety vent of the closure cap assembly.

According to an aspect of the present invention, the closure cap assembly in the storage battery includes a cover plate formed with the safety vent and formed at its bottom surface with a projection for engagement with the current collecting plate to be welded thereto. Alternatively, the current collecting plate is formed to increase specific resistance at a portion engaged with the bottom surface of the closure cap assembly.

According to another aspect of the present invention, there is provided a manufacturing method of an alkaline storage battery including a bottomed cell casing assembled as either one of position and negative terminals, a closure cap assembly coupled in a liquid-tight wanner with an opening of the cell casing as the other terminal to hermetically seal the interior of the cell casing and a generator element composed of positive and negative electrodes assembled within the cell casing. The manufacturing method comprises the steps of welding a current collecting plate extended from either one of the positive and negative electrodes to a bottom surface of the closure cap assembly at a first weld portion, coupling the closure cap assembly with the opening of the cell casing in such a manner that the generator element is contained in the cell casing and that the current collecting plate is engaged with the bottom surface of the closure cap assembly at a second weld portion thereof, and applying an electric current in a discharge direction of the storage battery between the cell casing and the closure cap assembly so that the current collecting plate is welded to the bottom surface of the closure cap assembly at its second weld portion.

BRIEF DESCRIPTION OF THE DRAWINGS

Other objects, features and advantages of the present invention will be more readily appreciated from the following detailed description of a preferred embodiment and modifications thereof when taken together with the accompanying drawings, in which.

DESCRIPTION OF PREFERRED EMBODIMENTS

Figure 1:
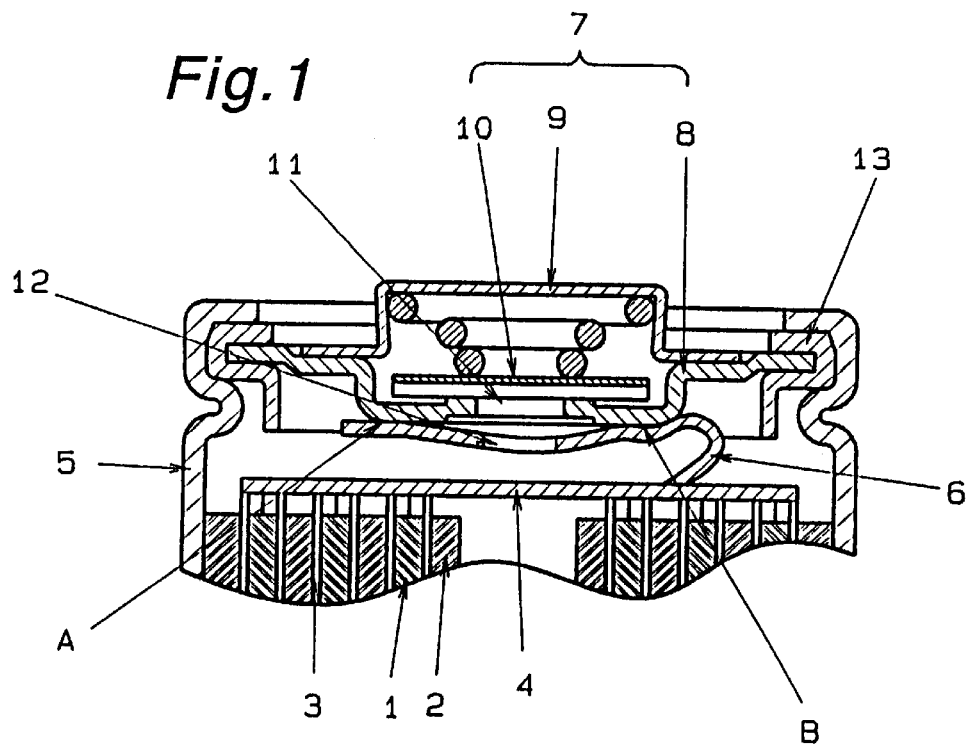
FIG. 1 is a vertical sectional view of a preferred embodiment of an alkaline storage battery according to the present invention.

In FIG. 1 of the drawings, there is illustrated a nickel-cadmium storage battery in accordance with the present invention, which includes a sintered nickel positive electrode 1 fabricated by the steps of forming a sintered nickel porous layer on the surface of an electrode core plate in the form of a punching sheet metal and impregnating nickel hydroxide as on active material into the sintered nickel porous layer by a chemical impregnation method and a sintered cadmium negative electrode 2 fabricated by impregnating cadmium hydroxide as an active material into the sintered nickel porous layer of the electrode core plate by the chemical impregnation method.

The sintered nickel positive electrode 1 and cadmium negative electrode 2 are spirally wound through a separator 3 disposed therebetween to provide a cylindrical generator element. An upper end portion of the punching sheet metal forming the electrode core plate of nickel positive electrode 1 is exposed at the upper surface of the cylindrical generator element, while a lower end portion of the punching sheet metal forming the electrode core plate of cadmium negative electrode 2 is exposed at the bottom of the cylindrical generator element. A perforated current collector 4 for the positive electrode 1 is welded to the exposed upper end portion of the punching sheet metal, while a perforated current collector (not shown) for the negative electrode 2 is welded to the exposed lower end portion of the punching sheet metal.

Figure 2:
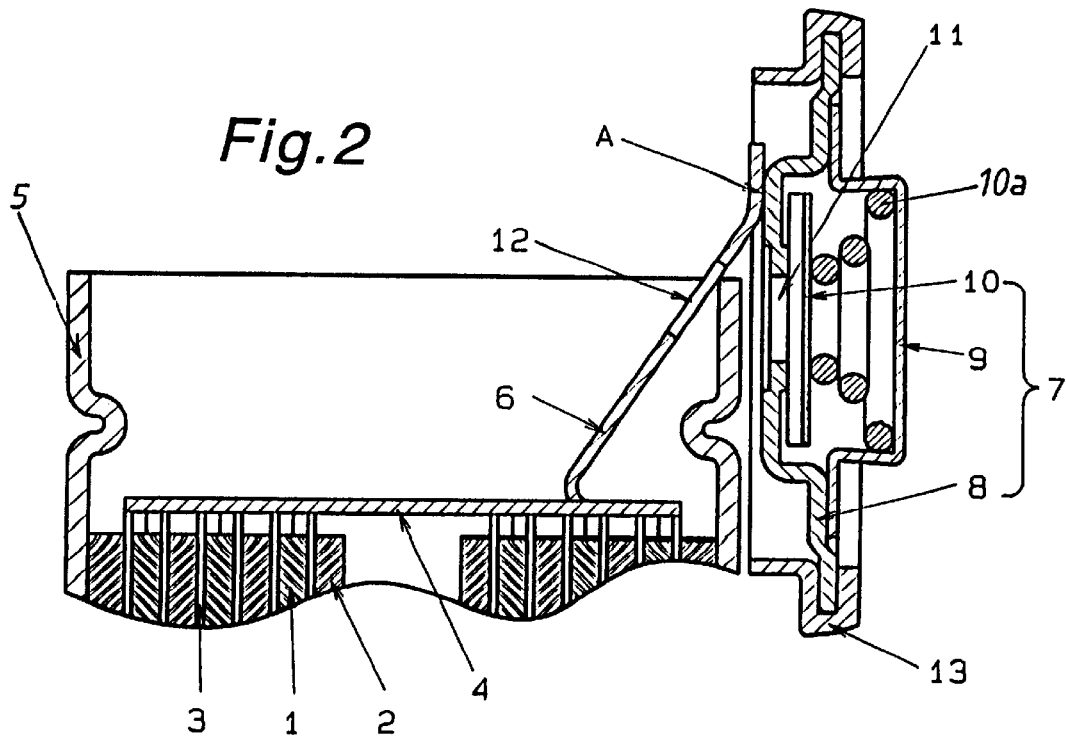
FIG. 2 is a vertical sectional view illustrating a closure cap assembly before coupling with a cell casing of the alkaline storage battery shown in FIG. 1.
Figure 3:
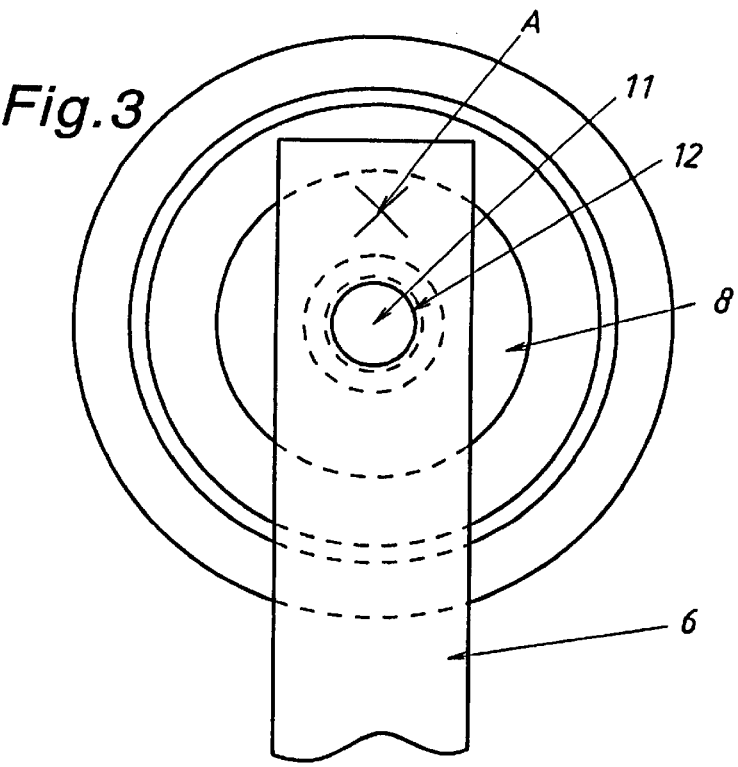
FIG. 3 is a plan view illustrating a positive current collecting plate welded at its distal end portion to a bottom surface of the closure cap assembly shown in FIG. 2.

During assembly process of the nickel-cadmium battery, as shown in FIGS. 2 and 3, the generator element is contained in a bottomed cell casing 5 of iron plated with nickel, and the current collecting plate for the negative electrode 2 is welded to an internal bottom surface of the cell casing 5 by spot-welding. Thereafter, a positive current collecting plate 6 extended from the current collector 4 is welded to a bottom surface of the closure cap assembly 7 at its distal end portion by spot-welding to provide a first weld portion A between the positive current collector 4 and the closure cap assembly 7.

The closure cap assembly 7 includes a cover plate 8 formed with a downwardly protruded disc portion, an external positive terminal in the form of a positive electrode cap 9 coupled with the cover plate 8 and a valve plate 10 disposed between the cover plate 8 and positive electrode cap 9 and loaded by a spiral coil spring 10a toward the disc portion of cover plate 8. The disc portion of cover plate 8 is formed at its center with a safety vent 11 for release of gas produced in the storage battery. The positive current collecting plate 6 is formed with an aperture 12 which is opposed to the safety vent 11 to permit the flow of gas discharged from the interior of the storage battery therethrough when the pressure of gas in the storage battery increases.

After the positive current collecting plate 6 was welded to the bottom surface of cover plate 8 at the first weld portion A during the assembly process of the storage battery, the closure cap assembly 7 is coupled with the opening of cell casing 5 through an annular insulation gasket 13, and the cell casing 5 is radially inwardly caulked at its opening end portion to hermetically seal the generator element. Thus, a nickel-cadmium battery of 1.7 Ah in nominal capacity can be assembled. When the closure cap assembly 7 has been coupled with the opening end of cell casing 5, the positive current collecting plate 6 is brought into contact with the bottom surface of the cover plate 8 at a second weld portion B shown in FIG. 1

Figure 4:
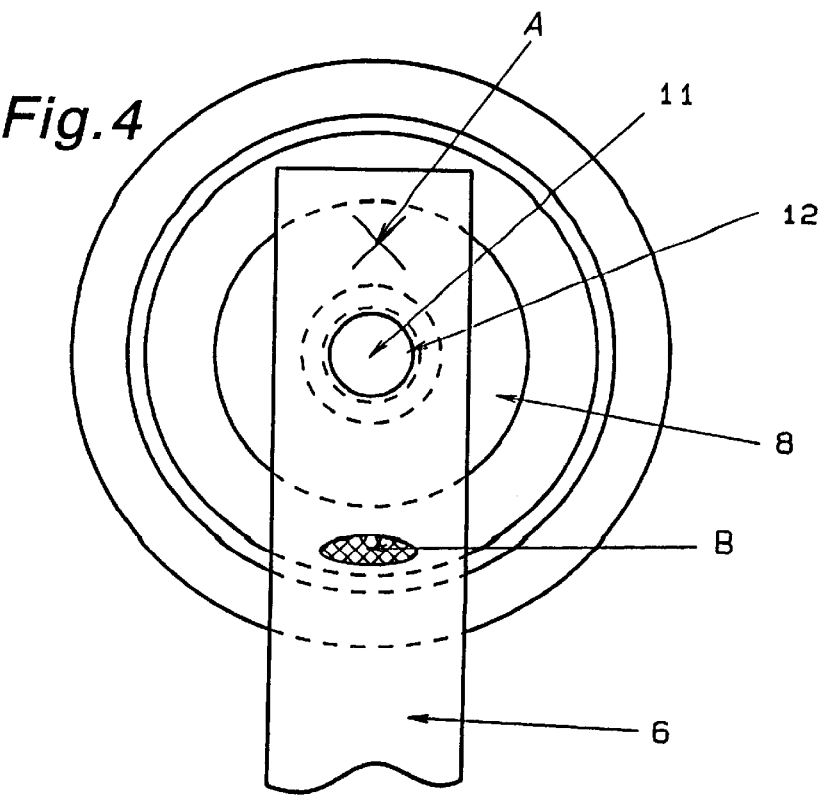
FIG. 4 is a plan view illustrating the positive current collecting plate welded at its two spaced portions to the bottom surface of the closure cap assembly shown in FIG. 1.

In the assembled storage battery, a voltage of 24 V is applied in a discharge direction of the storage battery between the positive electrode cap 9 and the bottom of cell casing 5 to cause the flow of electric current of 1 KA for a short period of about 15 msec. During such application of the voltage, the positive current collecting plate 6 is welded to the bottom surface of cover plate 8 at the second weld portion B as shown in FIGS. 1 and 4.

A comparative nickel-cadmium storage battery was manufactured by the same assembly process as in the foregoing embodiment without welding the positive current collecting plate 6 to the bottom surface of cover plate 8 at the second weld portion B. Vibration tests of the nickel-cadmium storage battery of the foregoing embodiment and the comparative nickel-cadmium storage battery were carried out in a condition where a vibration frequency is repeatedly changed to 5 Hz–55 Hz–5 Hz at constant vibrative acceleration for 120 sec to cause vertical vibration in the batteries for two hours. In the vibration tests, the vibrative acceleration was changed to various values such as 5 G, 10 G, 20 G, 30 G, 40 G and 70 G. After the vibration tests, the battery voltage was measured, and the batteries were disassembled to inspect the occurrence of disconnection at the positive current collecting plate 6. A result of the vibration tests are represented in the following table 1. Provided that, each sample number of the storage batteries is 10 pieces, and the number of samples wherein the positive current collecting plate 6 was removed from the cover plate are represented in the following table 1.

TABLE 1

| (Condition for vibration tests) | | | | | | |
|---|---|---|---|---|---|---|
| Vibrative acceleration: | | | G (Constant) | | | |
| Vibration frequency: | | | 5–55 Hz | | | |
| Repeated period: | | | 120 sec. | | | |
| Testing time: | | | 2 hours | | | |
| Vibrative Acceleration | 5 G | 10 G | 20 G | 30 G | 40 G | 70 G |
| Embodiment of Present invention | 0/10 | 0/10 | 0/10 | 0/10 | 0/10 | 0/10 |
| Comparative storage battery | 0/10 | 0/10 | 0/10 | 0/10 | 3/10 | 7/10 |

From the table 1, it will be understood that the vibration resistance property of the nickel-cadmium storage battery according to the present invention is enhanced when compared with the comparative storage batteries. The useful result is obtained by the fact that the positive current collecting plate 6 is welded to the bottom surface of cover plate 8 at the second weld portion B.

Figure 5:
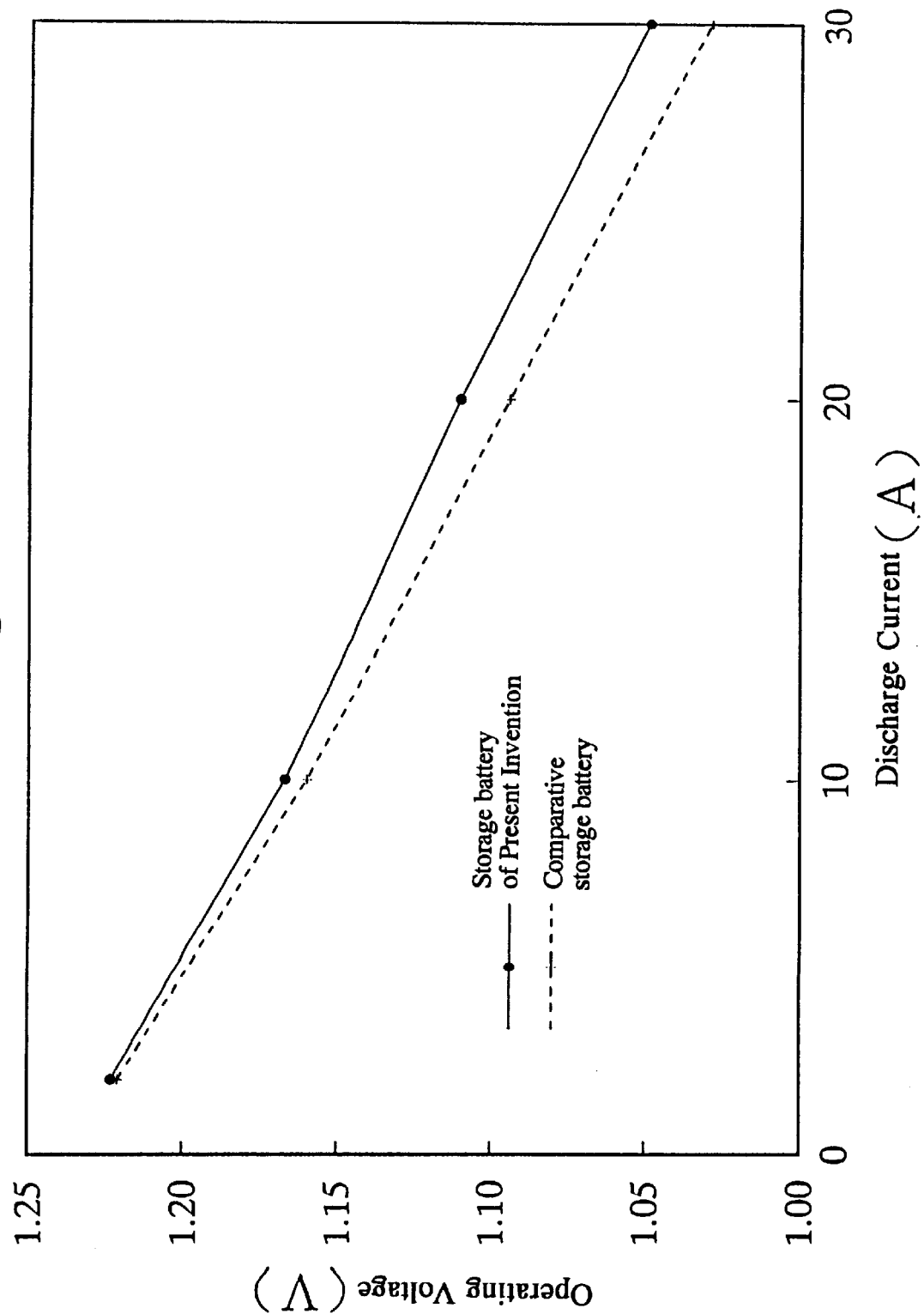
FIG. 5 is a graph showing operating voltage of the storage battery in relation to a discharge current.

Illustrated in FIG. 5 is each operating voltage of the nickel-cadmium storage battery according to the present invention and the comparative nickel-cadmium storage batteries in relation to a discharge current. In this instance, the operating voltage was measured in a condition where the storage batteries were rested for 60 minutes after charged with an electric current of 1.7 A for 72 minutes at ambient temperature of 25° C. and discharging to cause the flow of a constant electric current (2 A, 10 A, 20 A, 30 A) and where the discharge of the storage batteries was stopped at the time when the battery voltage became 0.8 V. After discharge, each internal resistance of the storage batteries was measured. As a result of the measurement, it has been confirmed that each internal resistance of the storage batteries according to the present invention becomes lower by about 0.5 mΩ than that of the comparative storage batteries. Due to the decrease of the internal resistance, as shown in FIG. 5, the operating voltage of the nickel-cadmium storage battery according to the present invention is maintained at a higher level than that of the comparative storage battery particularly under discharge of a great current. The useful results can be obtained by enhancement of the current collectivity at the welded portions of the positive current collecting plate 6.

In addition, the useful results were obtained irrespectively of a direction of electric current applied to the nickel-cadmium storage battery. When applied with an electric current of more than 300 A, the useful results were obtained irrespectively of the size of the storage battery. Provided that, the positive current collecting plate 6 is fused in a short time if applied with an extremely excessive current. For this reason, it is required to control the value of applied electric current to a value of more than 300 A and capable of avoiding disconnection of the positive current collecting plate 6. It is also noted that the useful results can be obtained when the electric current is applied to the positive current collecting plate 6 for more than 0.25 msec. If applied with the electric current for more than one seconds the positive current collecting plate 6 is fused. For this reason, it is required to apply the electric current to the positive current collecting plate 6 for more than 0.25 msec and less than one second.

In actual practices of the present invention, it is very important to properly engage the positive current collecting plate 6 with the bottom surface of the cover plate 7 thereby to increase current density at the engaged portion during application of the electric current so that the positive current collecting plate 6 is sufficiently heated by Joule heat generated at the engaged portion. To satisfy the foregoing requirements, various modifications of the nickel-cadmium storage battery according to the present invention will be described hereinafter.

Figure 6:
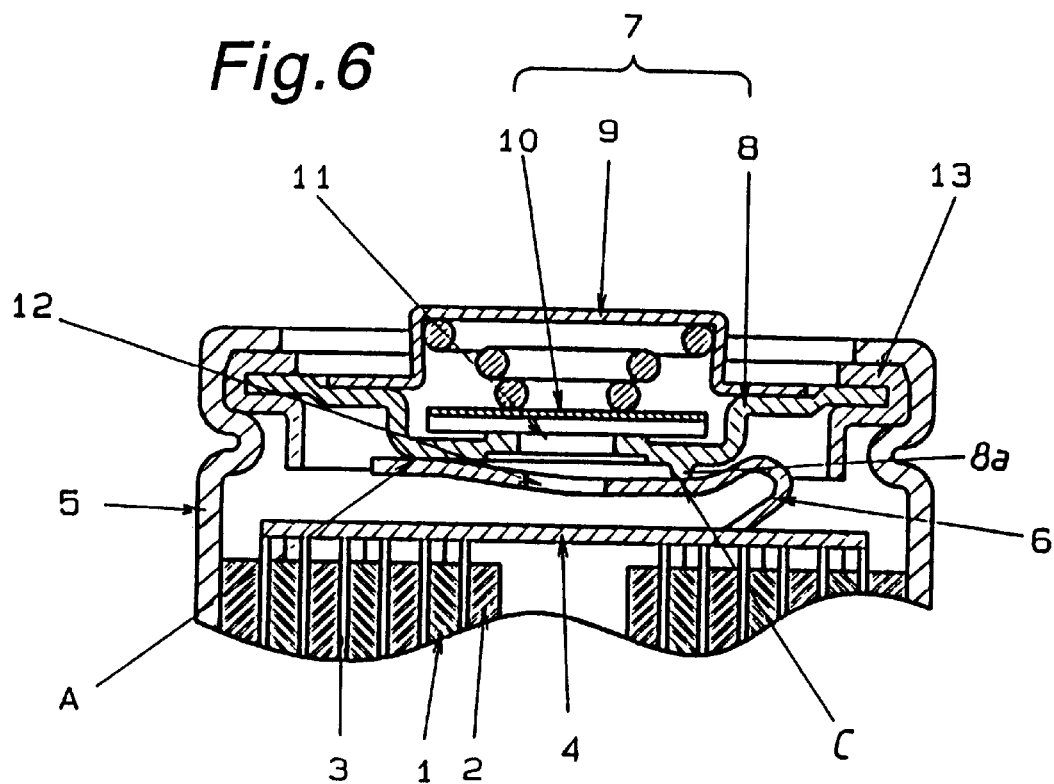
FIG. 6 is a vertical sectional view of a first modification of the alkaline storage battery shown in FIG. 1.

First Modification:

Illustrated in FIG. 6 is a first modification of the nickel-cadmium storage battery according to the present invention, wherein the cover plate 8 is formed at its bottom surface with a conical projection 8a for engagement with the positive current collecting plate 6. In this modification, the closure cap assembly 7 is coupled with the opening of cell casing 5 in the same manner as in the embodiment shown in FIGS. 1 and 2, and a voltage of 24 V is applied in a discharge direction of the battery between the external positive terminal in the form of the positive terminal cap 9 and the external negative terminal in the form of the bottom of cell casing 5 to cause the flow of electric current of 1 KA for about 15 msec, As a result, as shown in FIG. 6, the positive current collecting plate 6 is welded to the bottom of cover plate 8 at its projection 8a to provide a second weld portion C.

Second Modification

Figure 7:
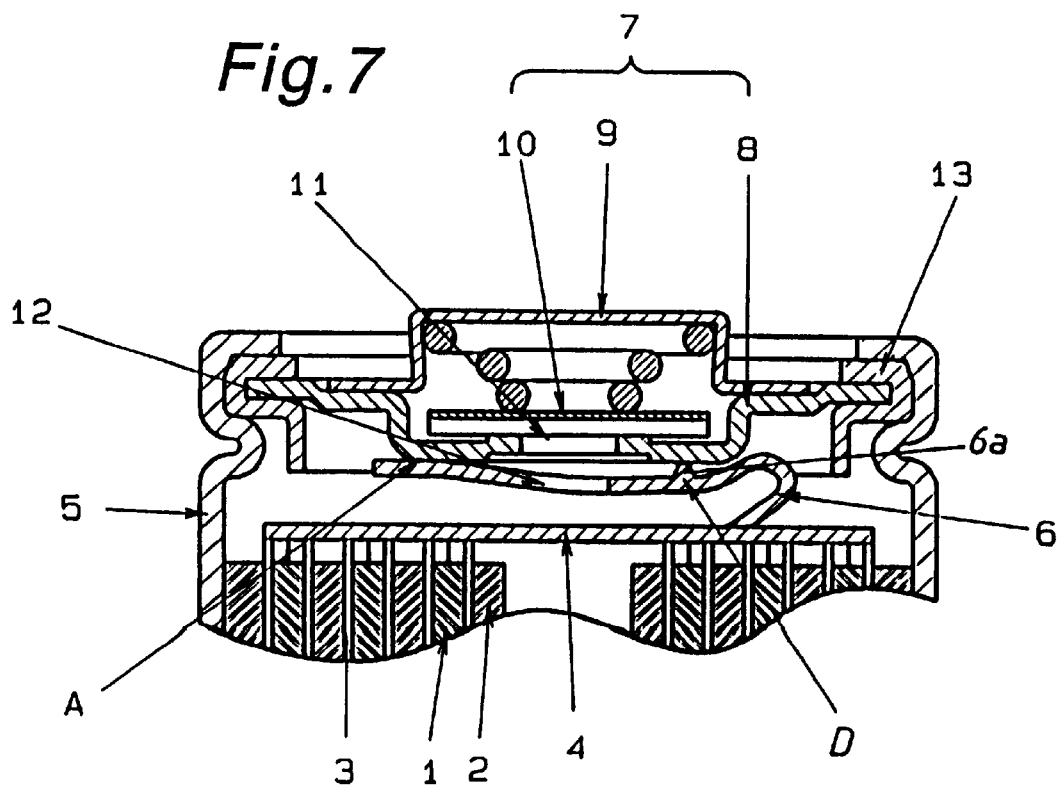
FIG. 7 is a vertical sectional view of a second modification of the alkaline storage battery shown in FIG. 1.

Illustrated in FIG. 7 is a second modification of the nickel-cadmium storage battery according to the present invention, wherein the positive current collecting plate 6 is formed with a conical projection 6a for engagement with the bottom surface of cover plate 8. In this modification, the closure cap assembly 7 is coupled with the opening of cell casing 5 in the same manner as in the embodiment shown in FIGS. 1 and 2, and a voltage of 24 V is applied in a discharge direction of the battery between the external position terminal in the form of the positive terminal cap 9 and the external negative terminal in the form of the bottom of cell casing 5 to cause the flow of electric current of 1 KA for about 15 msec. As a result, as shown in FIG. 7, the positive current collecting plate 6 is welded to the bottom surface of cover plate 8 at its projection 6a to provide a second weld portion D.

For comparative tests, ten pieces of the nickel-cadmium storage batteries in the embodiment shown in FIGS. 1 and 2 were prepared, and also ten pieces of the nickel-cadmium storage batteries respectively in the first and second modifications were prepared. For measurement of a formation rate of the second weld portion in these nickel-cadmium storage batteries, a voltage of 24 V was applied in the discharge direction of the battery between the external positive terminal in the form of the positive terminal cap 9 and the external negative terminal in the form of the bottom of the cell casing 5 to cause the flow of electric current of 1 KA respectively for 5.0 msec, 7.5 msec, 10.0 msec, 12.5 msec and 15.0 msec. A result of the measurement is represented in the following table 2.

TABLE 2

| Conduction Time | Embodiment of FIG. 1 | First Modification | Second Modification |
|---|---|---|---|
| 5.0 msec | 0/10 | 0/10 | 0/10 |
| 7.5 msec | 0/10 | 3/10 | 2/10 |
| 10.0 msec | 0/10 | 10/10 | 10/10 |
| 12.5 msec | 6/10 | 10/10 | 10/10 |
| 15.0 msec | 10/10 | 10/10 | 10/10 |

In the table 2, the measured numerical values each represent a formation rate of the second weld portion. From the table 2, it will be understood that the second weld portion respectively in the first and second modifications can be provided by a smaller amount of electricity than in the preferred embodiment shown in FIGS. 1 and 2 for the following reason. At the time when the voltage of 24 volt was applied between the positive terminal cap 9 and the bottom of the cell casing 5, the electric current concentrates into the projection 8a of cover plate 8 in the first modification or the projection 6a of positive current collecting plate 6 in the second modification. This increases current density at the engaged portion of the positive current collecting plate 6 with the cover plate 8 and generates a large amount of Joule heat at the engaged portion to enhance the formation rate of the second weld portion.

Although in the first and second modifications, the projection 8a or 6a was formed in a conical shape, the projection may be formed in a pyramid, a cylindrical or a truncated cone shape, and the projection may be formed on both the positive current collecting plate 6 and the cover plate 8.

Figure 8:
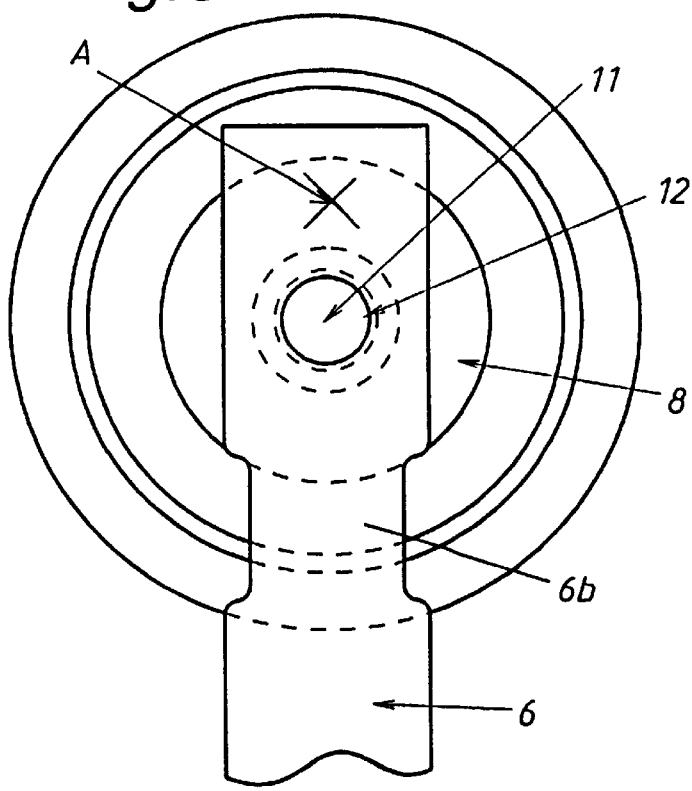
FIG. 8 is a plan view illustrating the positive current collecting plate welded at its distal end portion to the bottom surface of the closure cap assembly in a third modification of the alkaline storage battery shown in FIG. 1.

Third Modification:

Since the positive current collecting plate 6 in the foregoing embodiment is formed with the same thickness and the same width, every portion of the positive current collector plate 6 will have the same resistance value. As a result, the positive current collecting plate 6 is heated at a portion other than the portion engaged with the cover plate 8 when applied with the electric current. For this reason, it is preferable that the positive current collecting plate 6 is formed to be heated mainly at the portion engaged with the cover plate 8. Illustrated in FIG. 8 is a third modification of the nickel-cadmium storage battery according to the present invention, wherein a portion 6b of the positive current collecting plate 6 engaged with the cover plate 8 is formed smaller in width than the other portion of the same to increase a specific resistance value thereof.

Figure 9:
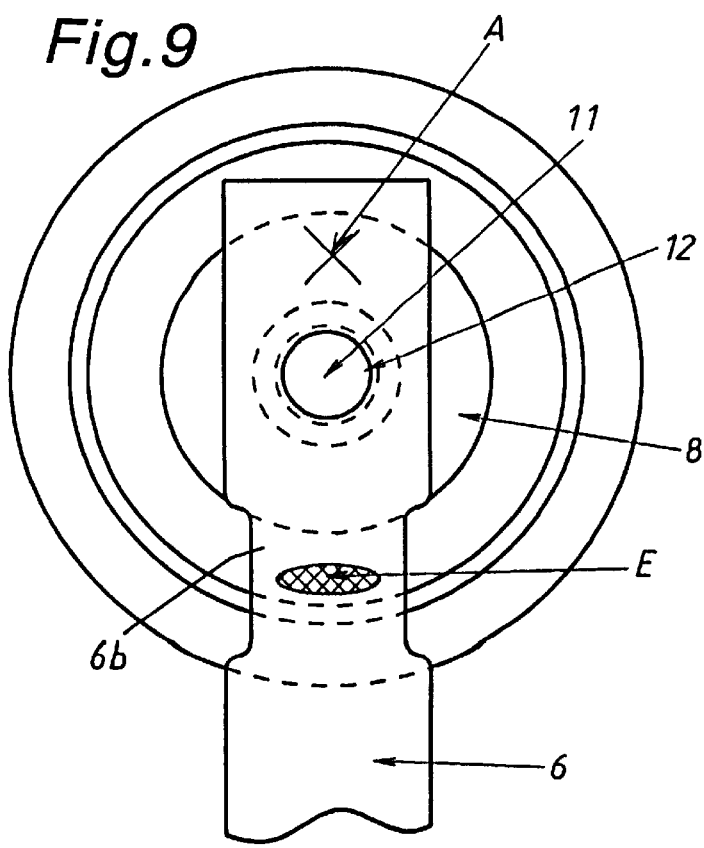
FIG. 9 is a plan view illustrating the positive current collecting plate welded at its two spaced portions to the bottom surface of the closure cap assembly in the third modification.

In the nickel-cadmium storage battery assembled with the modified positive current collecting plate 6 in the same manner as in the embodiment as shown in FIGS. 1 and 2, a voltage of 24 V is applied in a discharge direction of the battery between the external positive terminal in the form of the positive terminal cap 9 and the external negative terminal in the form of the bottom of cell casing 5 to cause the flow of electric current of 1 KA for about 15 msec. As a result, as shown in FIG. 9, the positive current collecting plate 6 is welded to the bottom surface of cover plate 8 at the portion 6b formed smaller in width to provide a second weld portion E.

For comparative tests, ten pieces of the nickel-cadmium storage batteries in the embodiment shown in FIGS. 1 and 3 were prepared, and also ten pieces of the nickel-cadmium storage batteries in the third modification were prepared. For measurement of a formation rate of the second weld portion in these nickel-cadmium storage batteries, a voltage of 24 V was applied in the discharge direction of the battery between the external positive terminal in the form of the positive terminal cap 9 and the external negative terminal in the form of the bottom of the cell casing 5 to cause the flow of electric current of 1 KA respectively for 5.0 msec, 7.5 msec, 10.0 msec, 12.5 msec and 15.0 msec. A result of the measurement is represented in the following table 3.

TABLE 3

| Conduction Time | Embodiment of FIG. 1 | Third Modification |
|---|---|---|
| 5.0 msec | 0/10 | 0/10 |
| 7.5 msec | 0/10 | 6/10 |
| 10.0 msec | 0/10 | 10/10 |
| 12.5 msec | 6/10 | 10/10 |
| 15.0 msec | 10/10 | 10/10 |

In the table 3, the measured numerical values each represent a formation rate of the second weld portion. From the table 3, it will be understood that the second weld portion in the third modification can be provided by a smaller amount of electricity than in the embodiment of FIG. 1 for the following reason. At the time when the voltage of 24 V was applied between the positive terminal cap 9 and the bottom of cell casing 5, the electric current concentrates into the portion 6b formed smaller in width in the third modification. This increases current density at the engaged portion of the positive current collecting plate 6 with the cover plate 8 and generates a large amount of Joule heat at the engaged portion to enhance the formation rate of the second weld portion.

Although in the third modification, the positive current collecting plate 6 has been formed smaller in width at the engaged portion 6b with the cover plate 8 to increase specific resistance at the second weld portion, the positive current collecting plate 6 may be formed with a slit or formed thinner in thickness at the engaged portion with the cover plate 8 other than the other portion to increase specific resistance at the second weld portion. Although in the foregoing embodiment and modifications, the present invention has been adapted to the nickel-cadmium storage battery with the sintered positive and negative electrodes, the present invention may be adapted to another storage battery of the paste type with non-sintered electrodes.

As is understood from the above description, the alkaline storage battery according to the present invention is characterized in that the positive current collecting plate 6 is welded at its two spaced portions with the closure cap assembly 7 to enhance mechanical strength and vibration resistance property of the storage battery and to decrease internal resistance of the storage battery thereby to enhance operational voltage thereof in discharge. With the manufacturing method of the alkaline storage battery according to the present invention, the positive current collecting plate 6 is welded at the engaged portion with the cover plate 8 after the closure cap assembly 7 has been coupled with the cell casing 5 of the storage battery. Thus, the positive current collector plate 6 can be shortened in a distance between the second weld portion and the positive current collector 4 to decrease internal resistance of the storage battery.

What is claimed is:

1. An alkaline storage battery including a bottomed cell casing comprising either one of positive and negative terminals, a closure cap assembly comprising the other one of said positive and negative terminals and which is coupled with an opening end of said cell casing in a liquid-tight manner to hermetically seal the interior of said cell casing, and a generator element comprising positive and negative electrodes assembled within said cell casing, wherein a current collecting plate extended from either one of said positive and negative electrodes has a distal end portion welded to a bottom surface of said closure cap assembly before said closure cap assembly is coupled with the opening end of said cell casing and an intermediate portion which engages the bottom surface of said closure cap assembly at a position spaced from the distal end when said closure cap assembly is coupled with the opening end of said cell casing to seal said generator element contained in said cell casing, whereby, upon the flowing of an electric current between said cell casing and said closure cap assembly, said intermediate portion is welded to the bottom surface of said closure cap assembly.

2. An alkaline storage battery as claimed in claim 1, wherein said closure cap assembly is provided with a safety vent for releasing gas produced in the storage battery, and wherein said current collecting plate is formed with an aperture positioned between the distal end and said intermediate portion welded to the bottom surface of said closure cap assembly and opposed to the safety vent of said closure cap assembly.

3. An alkaline storage battery as claimed in claim 2, wherein said closure cap assembly includes a cover plate is formed with said safety vent and formed with a projection for engagement with said current collector plate to be welded thereto.

4. An alkaline storage battery as claimed in claim 1, wherein said current collecting plate is formed with a projection for engagement with the bottom surface of said closure cap assembly to be welded thereto.

5. An alkaline storage battery as claimed in claim 1, wherein said current collecting plate is formed to increase specific resistance at a portion engaged with the bottom surface of said closure cap assembly.

6. An alkaline storage battery as claimed in claim 1, wherein at least one of said current collecting plate and the bottom surface of said closure cap assembly includes means for concentrating the electric current in a region of engagement between said current collecting plate and the bottom surface of said closure cap assembly.

7. An alkaline storage battery as claimed in claim 6, wherein said means for concentrating comprises a projection.

8. An alkaline storage battery as claimed in claim 1, wherein said current collecting plate includes means for increasing the electrical resistance of said current collecting plate in a region of engagement between said current collecting plate and the bottom surface of said closure cap assembly.

9. An alkaline storage battery as claimed in claim 8, wherein said means for increasing the electrical resistance comprises a portion of said current collecting plate having a reduced thickness.

10. An alkaline storage battery as claimed in claim 8, wherein said means for increasing the electrical resistance comprises a portion of said current collecting plate having a reduced width.

11. An alkaline storage battery as claimed in claim 8, wherein said means for increasing the electrical resistance comprises a slit formed in said current collecting plate.

12. An alkaline storage battery comprising:
- a case having an opening, said case comprising one of positive and negative terminals;
- a cap assembly comprising the other one of said positive and negative terminals, said cap assembly adapted to cap said opening of said case;
- a generator element contained in said case, said generator element having positive and negative electrodes; and
- a current collecting plate extending from one of said positive and negative electrodes, said current collecting plate having a distal end portion welded to a bottom surface of said cap assembly,
- wherein a portion of said current collecting plate, spaced from said distal end portion, contacts the bottom surface of said cap assembly when said cap assembly caps said opening of said case, and
- wherein at least one of said current collecting plate and the bottom surface of said cap assembly is configured to generate a concentrated electric current at the region of contact between said current collecting plate and the bottom surface of said cap assembly when a voltage is applied across said positive and negative terminals.

13. An alkaline storage battery as claimed in claim 12, wherein at least one of said current collecting plate and the bottom surface of said cap assembly is configured with a projection at said contact region.

14. An alkaline storage battery as claimed in claim 13, wherein the shape of said projection is one of a conical shape, a pyramid shape, a cylindrical shape, and a truncated cone shape.

15. An alkaline storage battery as claimed in claim 12, wherein the portion of said current collecting plate adjacent to said contact region is configured to have a higher resistance than other portions thereof.

16. An alkaline storage battery as claimed in claim 15, wherein the portion of said current collecting plate adjacent to said contact region is narrower than the other portions thereof.

17. An alkaline storage battery as claimed in claim 15, wherein the portion of said current collecting plate adjacent to said contact region is thinner than the other portions thereof.

18. An alkaline storage battery as claimed in claim 15, wherein the portion of said current collecting plate adjacent to said contact region includes a slit.

19. An alkaline storage battery comprising:
- a case having an opening, said case constituting one of positive and negative terminals;
- a cap assembly constituting the other one of said positive and negative terminals, said cap assembly adapted to cap said opening of said case;
- a generator element contained in said case, said generator element having positive and negative electrodes; and
- a current collecting plate extending from one of said positive and negative electrodes, said current collecting plate having a distal end portion welded to a bottom surface of said cap assembly,
- wherein a portion of said current collecting plate, spaced from said distal end portion, contacts the bottom surface of said cap assembly when said cap assembly caps said opening of said case, and
- wherein the portion of said current collecting plate adjacent to the region of contact between said current collecting plate and said bottom surface of said cap assembly is configured to have a higher electrical resistance than other portions thereof.

20. An alkaline storage battery as claimed in claim 19, wherein the portion of said current collecting plate adjacent to said contact region is narrower than the other portions thereof.

21. An alkaline storage battery as claimed in claim 19, wherein the portion of said current collecting plate adjacent to said contact region is thinner than the other portions thereof.

22. An alkaline storage battery as claimed in claim 19, wherein the portion of said current collecting plate adjacent to said contact region includes a slit.

* * * * *